United States Patent
Mylarappa et al.

(10) Patent No.: US 9,014,051 B2
(45) Date of Patent: Apr. 21, 2015

(54) UPDATING MULTICAST GROUP INFORMATION OF A CLIENT DEVICE OF A WIRELESS MESH NETWORK

(71) Applicants: Srinivasa Dommalur Mylarappa, San Jose, CA (US); Wenge Ren, Sunnyvale, CA (US)

(72) Inventors: Srinivasa Dommalur Mylarappa, San Jose, CA (US); Wenge Ren, Sunnyvale, CA (US)

(73) Assignee: ABB Inc., Cary, NC (US)

( * ) Notice: Subject to any disclaimer, the term of this patent is extended or adjusted under 35 U.S.C. 154(b) by 178 days.

(21) Appl. No.: 13/794,478

(22) Filed: Mar. 11, 2013

(65) Prior Publication Data

US 2014/0064142 A1 Mar. 6, 2014

Related U.S. Application Data

(60) Provisional application No. 61/694,900, filed on Aug. 30, 2012.

(51) Int. Cl.
*H04L 12/28* (2006.01)
*H04W 4/08* (2009.01)
*H04W 40/02* (2009.01)
*H04W 84/18* (2009.01)
*H04L 12/761* (2013.01)

(52) U.S. Cl.
CPC .............. *H04W 4/08* (2013.01); *H04W 40/02* (2013.01); *H04W 84/18* (2013.01); *H04L 45/16* (2013.01)

(58) Field of Classification Search
None
See application file for complete search history.

(56) References Cited

U.S. PATENT DOCUMENTS

| | | | |
|---|---|---|---|
| 6,704,301 B2 | 3/2004 | Chari et al. | |
| 6,965,575 B2 | 11/2005 | Srikrishna et al. | |
| 7,031,293 B1 | 4/2006 | Srikrishna et al. | |
| 7,058,021 B2 | 6/2006 | Srikrishna et al. | |
| 7,376,087 B2 | 5/2008 | Srikrishna | |
| 7,397,789 B2 | 7/2008 | Chari et al. | |
| 7,505,426 B2 | 3/2009 | Srikrishna et al. | |
| 7,551,562 B2 | 6/2009 | Srikrishna et al. | |
| 7,668,137 B2 | 2/2010 | Srikrishna et al. | |
| 7,688,808 B2 | 3/2010 | Ren et al. | |
| 7,689,224 B2 | 3/2010 | Chari et al. | |
| 2008/0132240 A1* | 6/2008 | Baek et al. | 455/442 |
| 2008/0186962 A1* | 8/2008 | Sinha | 370/389 |
| 2009/0046614 A1* | 2/2009 | Lewis et al. | 370/312 |
| 2012/0051275 A1* | 3/2012 | Alex et al. | 370/312 |
| 2012/0188934 A1 | 7/2012 | Liu et al. | |
| 2014/0301378 A1* | 10/2014 | Xu | 370/338 |

* cited by examiner

*Primary Examiner* — Kevin C Harper
(74) *Attorney, Agent, or Firm* — Brian R. Short

(57) ABSTRACT

Systems, methods and apparatuses for updating multicast group information of a client device of a wireless mesh network are disclosed. One method includes an access node of the wireless mesh network determining multicast group information of the client device that is connected to the access node, and the access node providing routing updates to upstream access nodes and a first upstream gateway, wherein the multicast group information of the client device is included within the routing updates of the client device.

14 Claims, 8 Drawing Sheets

UPDATING MULTICAST GROUP INFORMATION OF A CLIENT DEVICE OF A WIRELESS MESH NETWORK

RELATED APPLICATION

This patent application claims priority to U.S. Provisional Patent Application No. 61/694,900, filed on Aug. 30, 2012, which is herein incorporated by reference.

FIELD OF THE DESCRIBED EMBODIMENTS

The described embodiments relate generally to wireless communications. More particularly, the described embodiments relate to systems, methods and apparatuses for updating multicast group information of a client device of a wireless mesh network.

BACKGROUND

In computer networking, multicast includes the delivery of a message or information to a group of destination computers simultaneously in a single transmission from the source. For an embodiment, multicast is implemented as an IP multicast, which is often employed in Internet Protocol (IP) applications of streaming media and Internet television. In IP multicast, the multicast occurs at the IP routing level, where routers create optimal distribution paths for datagrams sent to a multicast destination address.

In order for multicast to operate properly in a wireless mesh network, routers within the wireless mesh network need to know whether any client devices connected to the wireless mesh network are a member of a multicast group.

It is desirable to have methods, systems and apparatuses for implementing a wireless mesh network that provides updating of multicast group information of client devices connected to the wireless mesh network.

SUMMARY

An embodiment includes method of updating multicast group information of a client device of a wireless mesh network. The method includes an access node of the wireless mesh network determining multicast group information of the client device that is connected to the access node, and the access node providing routing updates to upstream access nodes and a first upstream gateway, wherein the multicast group information of the client device is included within the routing updates of the client device.

Another embodiment includes a wireless access node. The wireless access node includes one or more transceivers for communicating with an upstream access node or a first upstream gateway of a wireless mesh network, and a client device. The access node further includes a controller. For this embodiment, the controller is operative to determine multicast group information of the client device, and provide routing updates to the upstream access node and the first upstream gateway, wherein the multicast group information of the client device is included within the routing updates of the client device.

Another embodiment includes a wireless mesh network. The wireless mesh network includes a first gateway and an access node. For this embodiment, the access node is operative to select a route through the wireless mesh network to the first gateway, determine multicast group information of a client device that is connected to the access node, and provide routing updates to upstream access nodes and the first gateway, wherein the multicast group information of the client device is included within the routing updates of the client device.

Other aspects and advantages of the described embodiments will become apparent from the following detailed description, taken in conjunction with the accompanying drawings, illustrating by way of example the principles of the described embodiments.

DETAILED DESCRIPTION

The embodiments described provide systems, methods and apparatuses for updating client device multicast group information within a wireless mesh network. Access nodes within a wireless mesh network make routing selections to a gateway within the wireless mesh network. Further, routing updates are performed so the gateways and upstream access nodes know where to route packets addressed to client devices connected to the wireless mesh network. For at least some embodiments, multicast group information of the client devices is included within the routing updates.

Figure 1:
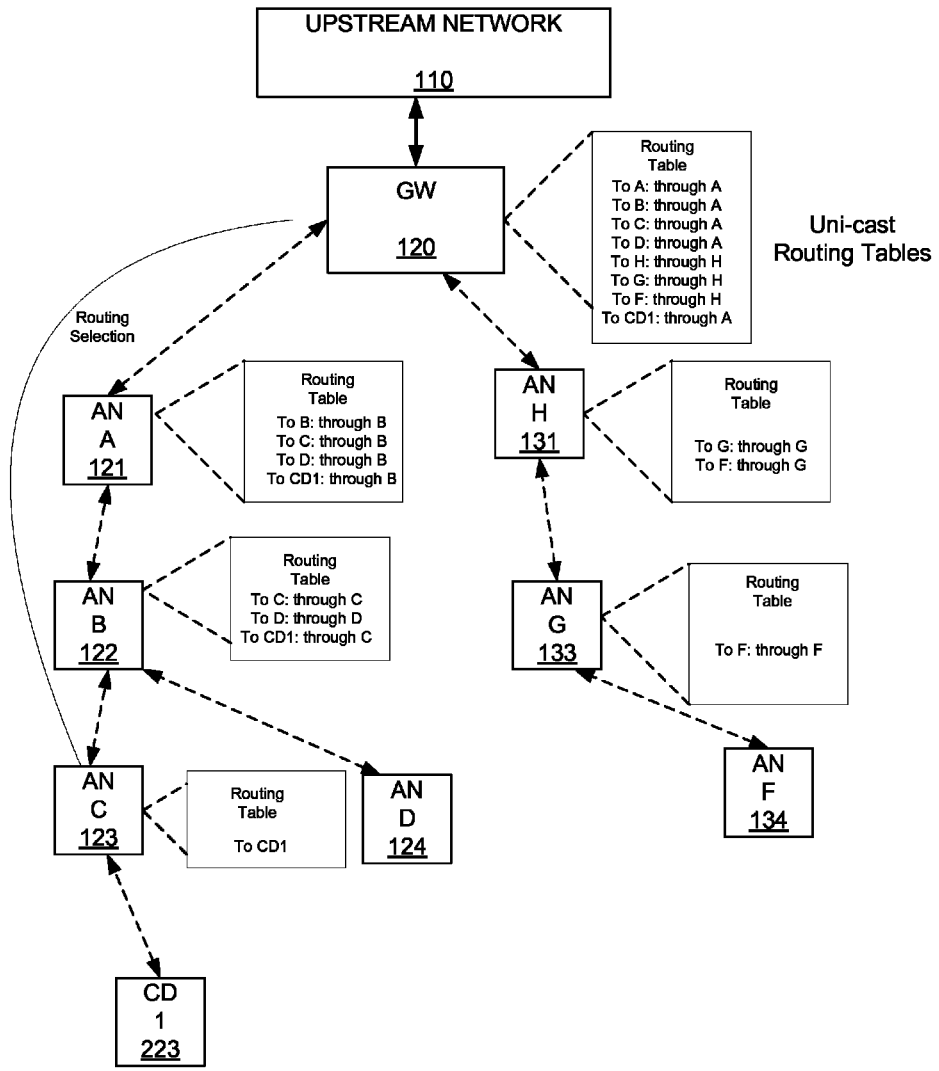
FIG. 1 shows a wireless network that includes a gateway, multiple access nodes and a client device, wherein the access nodes select routing paths to the gateway, according to an embodiment.

FIG. 1 shows a wireless network that includes a gateway, multiple access nodes and a client device, wherein the access nodes select routing paths to the gateway, according to an embodiment. As shown, a gateway 120 is interfaced with an upstream network 110. The gateway 120 typically includes high-bandwidth connection to the upstream network 110 which can be wired or wireless. Further, the upstream network 110 can include wired and wireless links. For an embodiment, the gateway 120 is an access node that can originate routing beacons. Further, the mesh network includes multiple access nodes 121, 122, 123, 124, 131, 133, 134. Additionally, the mesh network includes a client device 223 which is connected to the access node C 123.

For at least some embodiments, each of the access nodes 121, 122, 123, 124, 131, 133, 134 selects a routing path to the gateway 120. The access nodes 121, 122, 123, 124, 131, 133, 134 are coupled either directly or indirectly to the gateway 120. That is, each access node is either directly connected to the upstream 120, or indirectly connected through another access node to the upstream gateway 120. Many factors can be included in the decision of which access nodes or gateways each access node is connected. Clearly, the network of FIG. 1 can include any number of additional gateways and access nodes.

For an embodiment, the gateway 120 broadcasts routing packets (beacons), which can be used to determine routing between the access nodes 121, 122, 123, 124, 131, 133, 134 and the gateways 120 of the network. The routing beacons are received by all first-level access nodes (for example, access nodes 121, 131), which are access nodes that are able to receive gateway transmitted beacons, and directly route data through to the gateway 120.

For an embodiment, the beacons are used to establish a route from each access node to the gateway. For an embodiment, the first level access nodes re-broadcast the beacon data, attaching their own information to the routing beacon. The information indicates to the second level access nodes that the path to the gateway includes the first level access node.

For one embodiment, the link quality of the routing beacon received determines whether that routing beacon is rebroadcast by each access node. If the quality of the routing beacon is above a determined threshold, it is rebroadcast. The beacons can be used to determine the quality of the link in both an upstream (towards a gateway) direction, and in a downstream (away from a gateway) direction. The upstream and the downstream link qualities can be used by each access node to select the best data routing path to a gateway.

Each access node has at least one upstream access node or gateway, and may have a plurality of downstream nodes. Upstream nodes are the nodes that are between the access node and the gateway. For a level one access node, there is only one upstream node, the gateway. For a level four access node, there are four upstream nodes, which define the access node's path to the gateway. Downstream nodes are nodes that receive the beacon from a particular access node, and define their path to the gateway through that access node.

FIG. 1 also includes second level access nodes 122, 133. As shown, the access node 122 can select a data path through access node 121, through access node 131, through the gateway 120, or even through the access node 133. The access node 122 makes the data path routing selection based upon the best quality combination of the links (downstream and upstream) within the available data paths to the gateway 120.

The depth of re-broadcast can be determined by the network. For example, an access node may rebroadcast a beacon only if there are 5 or fewer hops between the access node and the gateway. The number of hops associated with an access node defines how many intermediate access nodes there are between the access node and a gateway. First level access nodes (as defined above) are one hop away from a gateway. Second level access nodes are two hops away from a gateway.

For another embodiment, other link quality factors, such as traffic congestion, battery status of upstream access nodes, thickness of the pipeline, backend (i.e. gateway) capacity, latency, or other factors may be used to determine whether the beacon should be rebroadcast.

Once a routing selection has been made, each upstream access node and gateway needs to be aware of the selected routing path so that each upstream access node and gateway can properly forward data packets to the proper destination. One way to accomplish this is for each access node to transmit a reverse beacon to its upstream access node or gateway that includes the selected routing information. For an embodiment, the upstream access node and the upstream gateway maintains a routing table that can be maintained based on routing updates received from downstream access nodes.

For an embodiment, each access node transmits a routing update to upstream access nodes or gateways upon the access node attaching to an upstream access node or gateway. For another embodiment, routing updates are transmitted periodically. It is to be understood that the routing updates can alternatively or additionally be performed at other strategic times.

When the reverse beacon is received, the access node learns all of the downstream access nodes whose routes to the gateway pass through this particular access node. For one embodiment, the access node also stores this information. For one embodiment the upstream and downstream paths are stored in a temporary memory. For one embodiment, the temporary memory is the routing table. For another embodiment, the temporary memory may be a cache. It is to be noted that the size of the temporary memory is of the order of the number of access nodes connected to a particular access node downstream, and the data of the upstream access node which leads the access node to the gateway.

FIG. 1 shows exemplary routing tables associated with each of the access nodes 121, 122, 123, 124, 131, 133, 134 and the gateway 120. For example, the routing table of the access node C 123 allows the access node C 123 to determine that a packet received by the access node C 123 having a destination address of CD1 223 is to be directly routed to CD1 223. The routing table of the access node B 122 allows the access node B 122 to determine that a packet received by the access node B 122 having a destination address of CD1 223 is to be routed through access node C 123. The routing table of the access node A 121 allows the access node A 121 to determine that a packet received by the access node A 121 having a destination address of CD1 223 is to be routed through access node B 122. Further, the routing table of the access node A 121 allows the access node A 121 to determine that a packet received by the access node A 121 to be routed through the access node C 123 or the access node D 124 are to be routed through the access node B 122.

In contrast to the multicast group information to be described, the routing tables are unicast routing tables.

Figure 2:
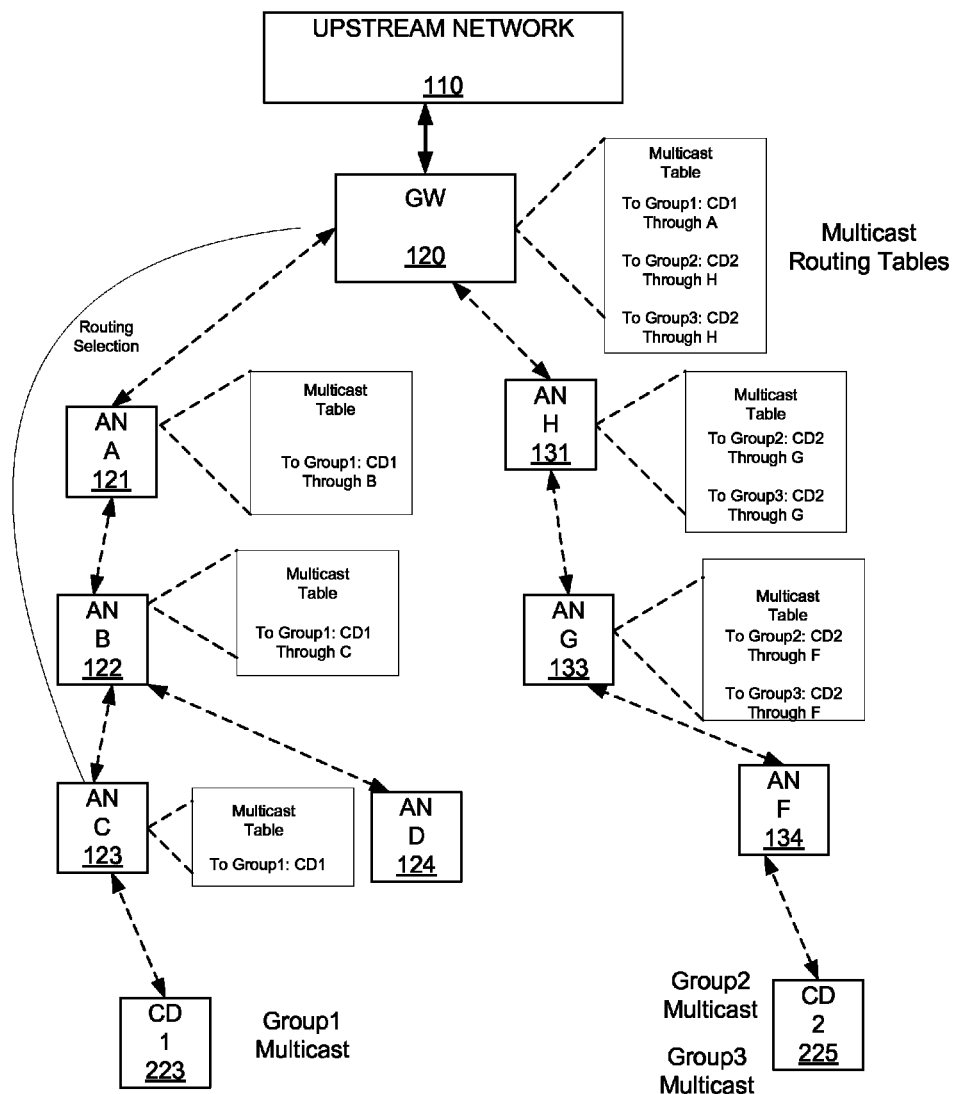
FIG. 2 shows a wireless network that includes a gateway, multiple access nodes and client devices, wherein the client devices belong to multicast groups, according to an embodiment.

FIG. 2 shows a wireless network that includes a gateway, multiple access nodes and client devices, wherein the client devices belong to multicast groups, according to an embodiment. For at least some embodiment, each of the client device connected to the wireless mesh network are able to be included within multicast groups. The multicast membership (multicast group information) of each client device can be included within the previously described routing updates. As shown, the client device CD1 223 belongs to the Group1 Multicast, and the client device CD2 225 belongs to the Group2 Multicast and the Group3 Multicast.

In computer networking, multicast is the delivery of a message or information to a group of destination computers simultaneously in a single transmission from the source. For an embodiment, multicast is implemented in IP multicast, which is often employed in Internet Protocol (IP) applications of streaming media and Internet television. In IP multicast the implementation of the multicast concept occurs at the IP routing level, where routers create optimal distribution paths for datagrams sent to a multicast destination address.

IP multicast is a technique for one-to-many communication over an IP infrastructure in a network. IP multicast scales to a larger receiver population by not requiring prior knowledge of who or how many receivers there are. Multicast uses network infrastructure efficiently by requiring the source to send a packet only once, even if it needs to be delivered to a large number of receivers.

If a router, such as, the gateway 120 receives multicast data traffic that includes a multicast data packet, the gateway forwards the multicast data packet to the proper destinations within the wireless mesh network. However, the router needs to have information indicating to the router where the router is to forward multicast data packet received by the router.

For an embodiment, the previously describe routing updates sent by each access node to upstream access nodes and upstream gateways includes the multicast group information of client devices connected to an access node of the wireless mesh network.

First, the client device decides whether to be a member of a multicast group. For an embodiment, the establishment of the client device as a member of the multicast group is facilitated according to the Internet Group Management Protocol (IGMP). That is, the client device communicates using an IGMP packet to known multicast group addresses.

Second, the access node that the client device are connected to determines the multicast group associations of each of the client devices. Again, this determination is facilitated according to the Internet Group Management Protocol (IGMP). When the access node receives multicast group data traffic from an upstream network, an upstream gateway or an upstream access node, the access node checks to determine if one or more of the client devices associated with the access nodes are member of the multicast group of the multicast data traffic. If one or more of the client devices are members of the multicast group, the access node forwards the multicast data traffic as directed by a multicast routing table of the access node.

Finally, each access node includes the multicast group membership (multicast group information) of the client device within routing updates provided by the access node to upstream access nodes and gateways per the described embodiments.

The multicast routing tables are similar to the routing tables previously described. When the gateway 120 receives a Group 1 multicast data packet (within multicast data traffic), the gateway 120 knows to forward the multicast data packet through the access node A 121, which knows to further forward the multicast data packet through the access node B 122, which knows to further forward the multicast data packet through the access node C 123, which knows to further forward the multicast data packet through the client device CD1 223. When the gateway 120 receives a Group 2 multicast data packet, the gateway 120 knows to forward the multicast data packet through the access node H 131, which knows to further forward the multicast data packet through the access node G 133, which knows to further forward the multicast data packet through the access node F 134, which knows to further forward the multicast data packet through the client device CD2 225. When the gateway 120 receives a Group 3 multicast data packet, the gateway 120 knows to forward the multicast data packet through the access node H 131, which knows to further forward the multicast data packet through the access node G 133, which knows to further forward the multicast data packet through the access node F 134, which knows to further forward the multicast data packet through the client device CD2 225.

It is to be understood that for at least some embodiments, the multicast data traffic is forwarded to downstream access nodes using reliable unicast transmission. As will be described, the multicast data traffic can be multicast or unicast to the client device.

It is to be understood that unicast routing information and the multicast routing information can be updated and maintained in parallel. That is, a single one client device, or more multiple client devices can have both unicast (such as, the routing information) and multicast information associated to them, so that the client devices can receive unicast and/or multicast data traffic.

Figure 3:
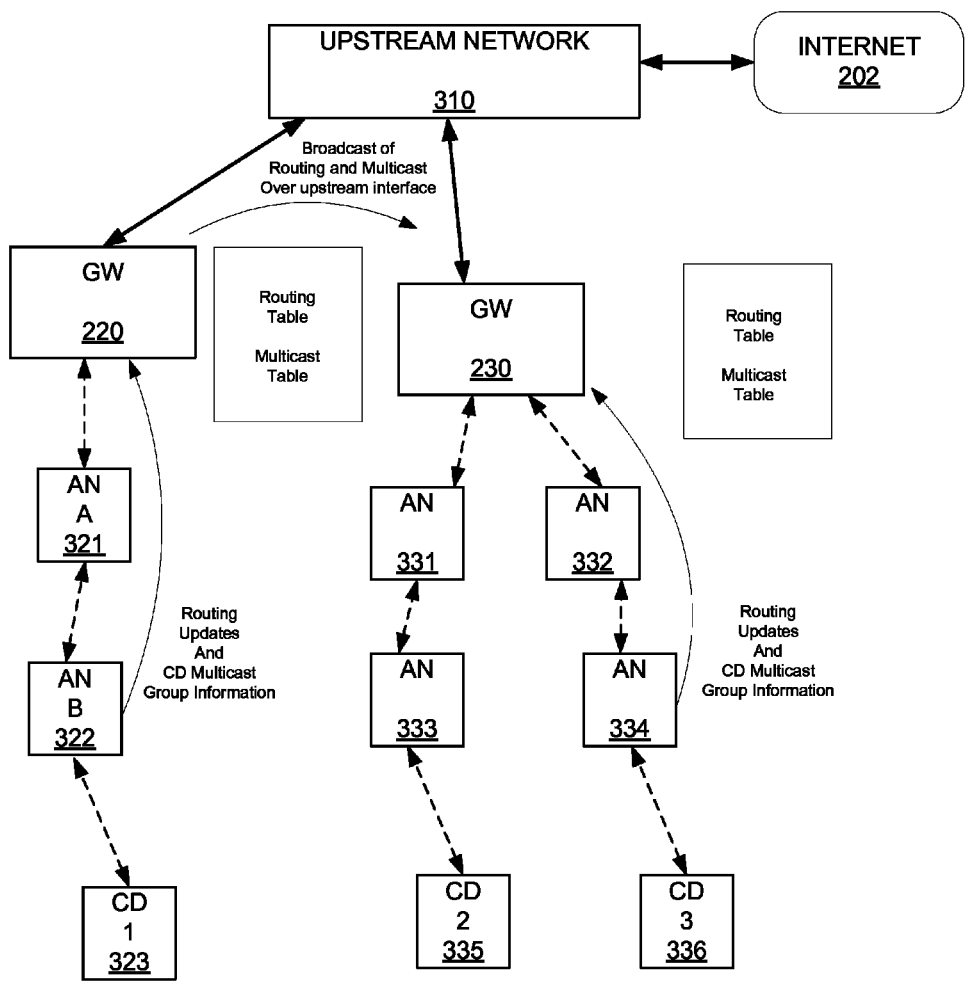
FIG. 3 shows a wireless network that includes multiple gateways, multiple access nodes and client devices, wherein multicast group information of the client devices are updated, according to an embodiment.

FIG. 3 shows a wireless network that includes multiple gateways 220, 230, multiple access nodes 321, 322, 331, 332, 333, 334, 335, and client devices 323, 336, wherein multicast group information of the client devices 323, 336 are updated, according to an embodiment. This embodiment shows multiple gateways 220, 230 wherein each gateway 220, 230 maintains a routing table and multicast routing table for all access nodes and client device that are connected through the wireless mesh network to the gateways 220, 230. As will be described, embodiments include gateways broadcasting over an upstream network (for an embodiment, the gateways are connected through, for example, a wired Ethernet connection to the upstream network. However, the gateways can also be wirelessly connected to the upstream network) the unicast and multicast information of each of the client devices to other gateways of the wireless mesh network. As shown, the gateways 220, 230 are connected to an upstream network 310, which can be connected to the internet 202.

As stated, the gateways 220, 230 can broadcast the unicast and multicast information of the client devices. For an embodiment, gateways within a common or same subnet the gateways broadcast the client device multicast and unicast information to other gateways within the subnet. If the gateways are in different subnets, the gateway of the different subnet can request the unicast and multicast information from an original gateway if, for example, the client device roams to the gateway (or an access node that has selected a route to the gateway). All gateways within the same subnet should receive the broadcast routing and multicast group information of all client devices connected to the subnet of the broadcasting gateway.

Figure 4:
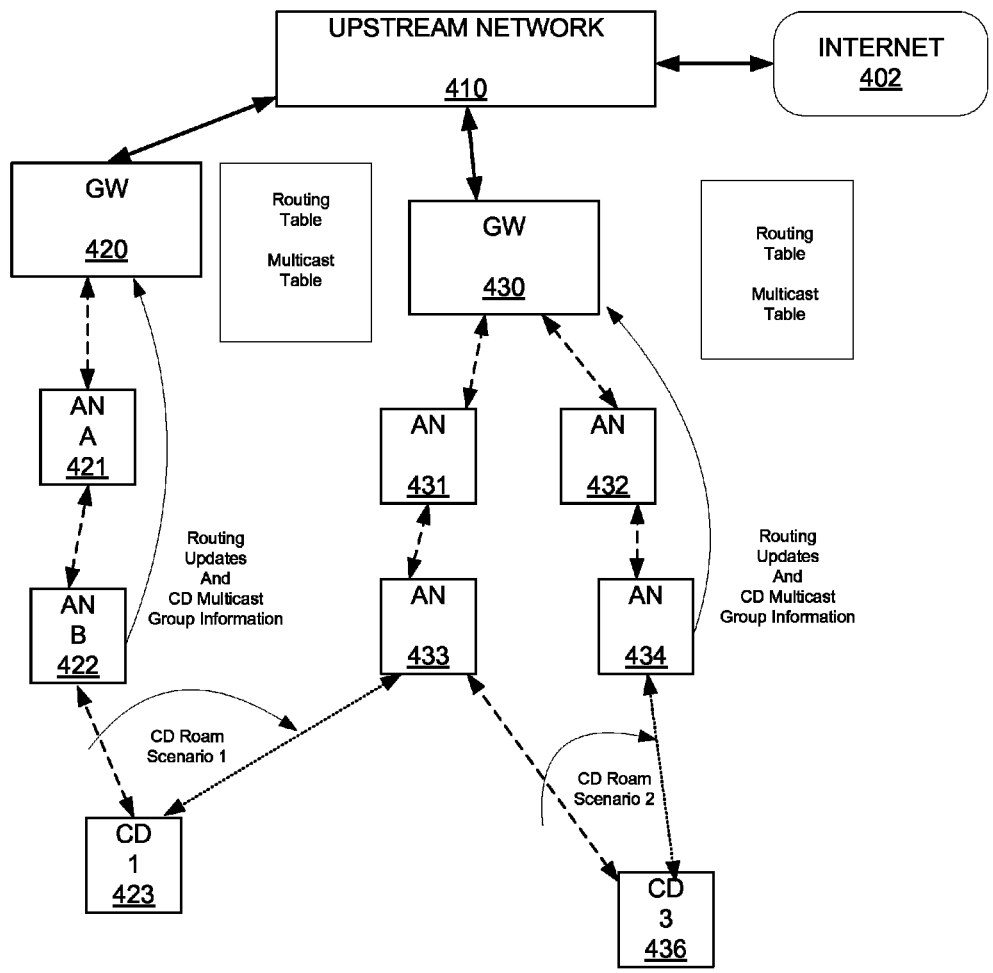
FIG. 4 shows a wireless network that includes multiple gateways, multiple access nodes and client devices, wherein the client devices roam, and multicast group information of the client devices are updated, according to an embodiment.

FIG. 4 shows a wireless network that includes multiple gateways 420, 430, multiple access nodes 421, 422, 431, 432, 433, 434 and client devices 423, 436, wherein the client devices 423, 436 roam, and multicast group information of the client devices 423, 436 are updated, according to an embodiment. In preparation for the possibility of roaming, the first upstream gateway shares the multicast group information of the client device with neighboring gateways. Therefore, if the client device roams to a new access node, the gateway associated with the new access node is able to determine the multicast group association or membership of the client device.

FIG. 4 shows a couple of possible situations of a client device route to a new access node. A first scenario (CD Roam Scenario 1) includes the client device (for example, the client device CD1 423) roaming to a new access node (such as, access node 433) that has a different upstream gateway (such as, gateway 430) than the upstream gateway (such as, gateway 420) of the original access node (such as, access node 422). A second scenario (CD Roam Scenario 2) includes the client device (such as, client device 436) roaming to a new access node (such as, access node 434) that has the same upstream gateway (such as, gateway 430) that is the same upstream gateway as the original access node (such as, access node 433).

The gateways 420, 430 are connected to the upstream network 410, which is connected to the internet 402. For an embodiment, gateways within the same subnet as the broadcasting gateway are defined as neighboring gateways of the broadcasting gateway.

For an embodiment, if the client device roams to a second gateway, the first upstream gateway deletes multicast (assuming no other client device connected to the gateway is a member of the multicast group) and unicast information of the client device. Further, when the client device roams to the second gateway, the second gateway accesses the multicast group information of the client device. Additionally, if the second gateway cannot obtain the multicast group information of the client device from the first upstream gateway or from one of neighboring gateways, the second gateway broadcasts a request for the multicast group information of the client device. For an embodiment, once the second gateway obtains the multicast group information of the client device from the first upstream gateway or from one of gateways (neighboring) of the same subnet, the second gateway populates multicast group information of the client device.

Figure 5:
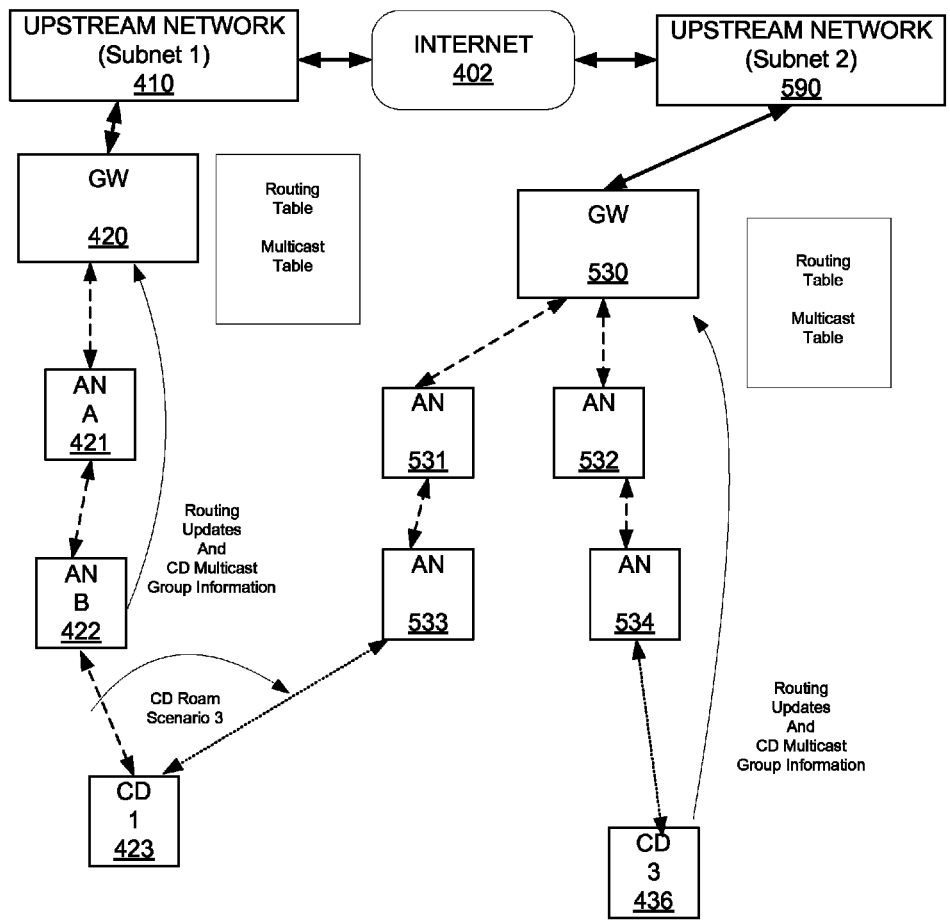
FIG. 5 shows a wireless network that includes multiple gateways of multiple subnets, multiple access nodes and client devices, wherein the client devices roam, and multicast group information of the client devices are updated, according to an embodiment.

FIG. 5 shows a wireless network that includes multiple gateways 420, 530 of multiple subnets 410, 590, multiple access nodes 421, 422, 531, 532, 533, 534 and client devices 423, 436, wherein the client devices 423, 436 roam, and multicast group information of the client devices 423, 436 are updated, according to an embodiment. As shown, the gateway 420 is connected to the upstream network 410 which has a first subnet. However, the gateway 530 is connected to another upstream network 590 that has a second subnet. Therefore, when the gateway 420 of the first subnet broadcasts the multicast group information and the routing information, the gateway 530 of the second subnet may not receive the multicast group information and the routing information. Downstream access nodes 531-534 are connected (directly or indirectly) to the gateway 530.

For an embodiment, when a gateway (such as, gateway 530) receives information from a downstream access node of a new client from a different subnet (for example, the client device 423 roams from the access node 422 of the first subnet to the access node 533 of the second subnet), the gateway request the client information from the prior gateway of the prior subnet. The gateway can determine the prior subnet IP address from the client device. The gateway requests the client device multicast group information from the prior gateway of the prior subnet based on the prior subnet IP address. The prior gateway deletes the multicast group information if no other client device associated with the prior gateway is a member of the multicast group. Consistent with prior descriptions, the new gateway then broadcasts the multicast group information and the routing information of the client device.

Figure 6:
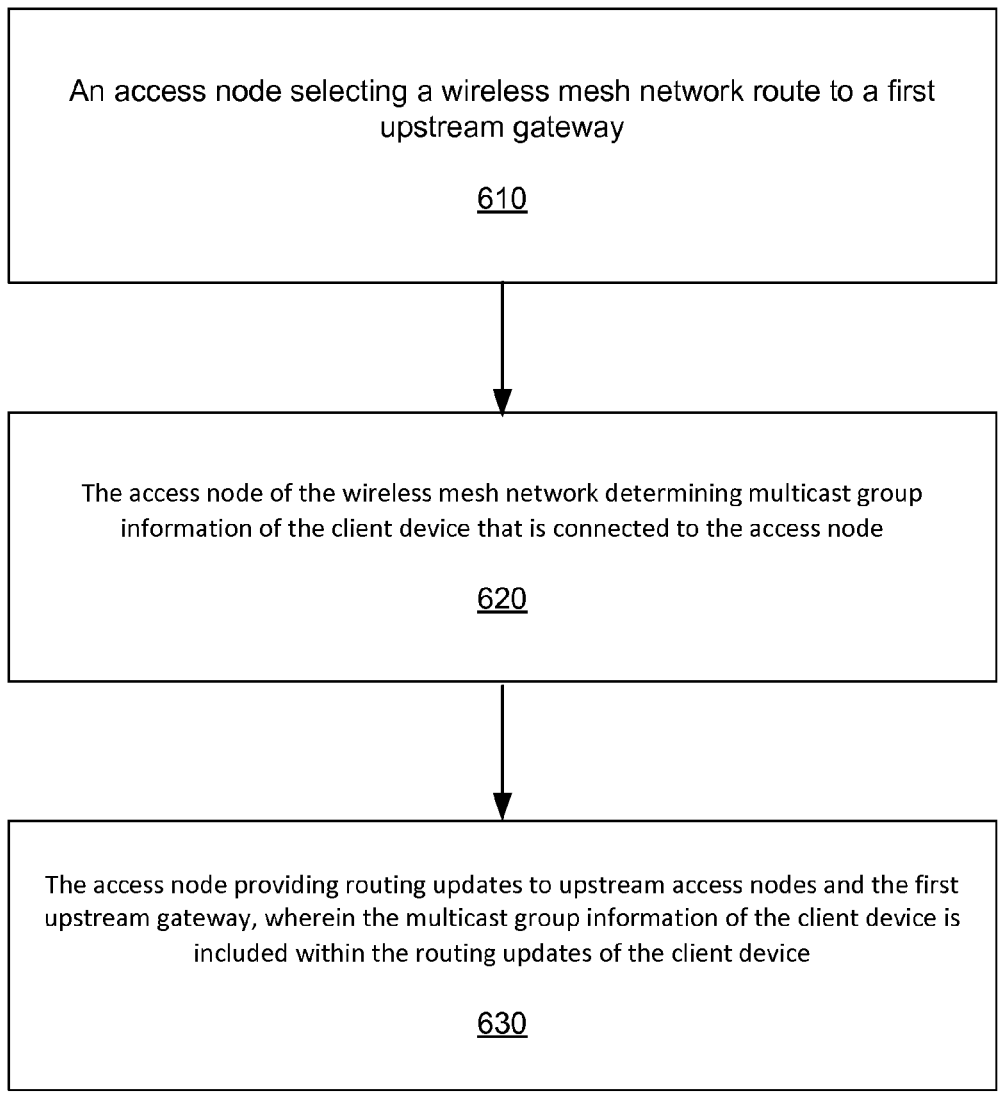
FIG. 6 is a flow chart that includes steps of a method of updating multicast group information of a client device of a wireless mesh network, according to an embodiment.

FIG. 6 is a flow chart that includes steps of a method of updating multicast group information of a client device of a wireless mesh network, according to an embodiment. A first step 610 includes an access node selecting a wireless mesh network route to a first upstream gateway. A second step 620 includes the access node of the wireless mesh network determining multicast group information of the client device that is connected to the access node. A third step 630 includes the access node providing routing updates to upstream access nodes and a first upstream gateway, wherein the multicast group information of the client device is included within the routing updates of the client device.

The routing updates include all devices or access nodes connected downstream of the access node. The routing information builds (increases) for each access node closer to the gateway, wherein the gateway includes the most routing and multicast group information.

For an embodiment, the first upstream gateway acts as a multicast proxy for the client devices selecting to be associated with one or more multicast groups. That is, the first upstream gateway acts as a proxy for downstream client devices that route through the gateway. That is, the gateway manages data traffic on behalf of the downstream client devices. For an embodiment, the proxy includes an IGMP proxy. For an embodiment, the gateway send IGMP packets to the upstream network for each group the client (or client devices) belongs to.

For an embodiment, the first upstream gateway shares the multicast group information of the client device with neighboring gateways. For an embodiment, neighboring gateways include gateways having the same subnet as the first upstream gateway.

For an embodiment, if the client device roams to a second gateway, the first upstream gateway deletes multicast and unicast information of the client device, and when the client device roams to the second gateway, the second gateway accesses the multicast group information of the client device. For an embodiment, if the second gateway cannot obtain the multicast group information of the client device from the first upstream gateway or from one of neighboring gateways, the second gateway broadcasts a request for the multicast group information of the client device. For an embodiment, once the second gateway obtains the multicast group information of the client device from the first upstream gateway or from one of neighboring gateways, the second gateway populating a multicast route of the client device.

Figure 7:
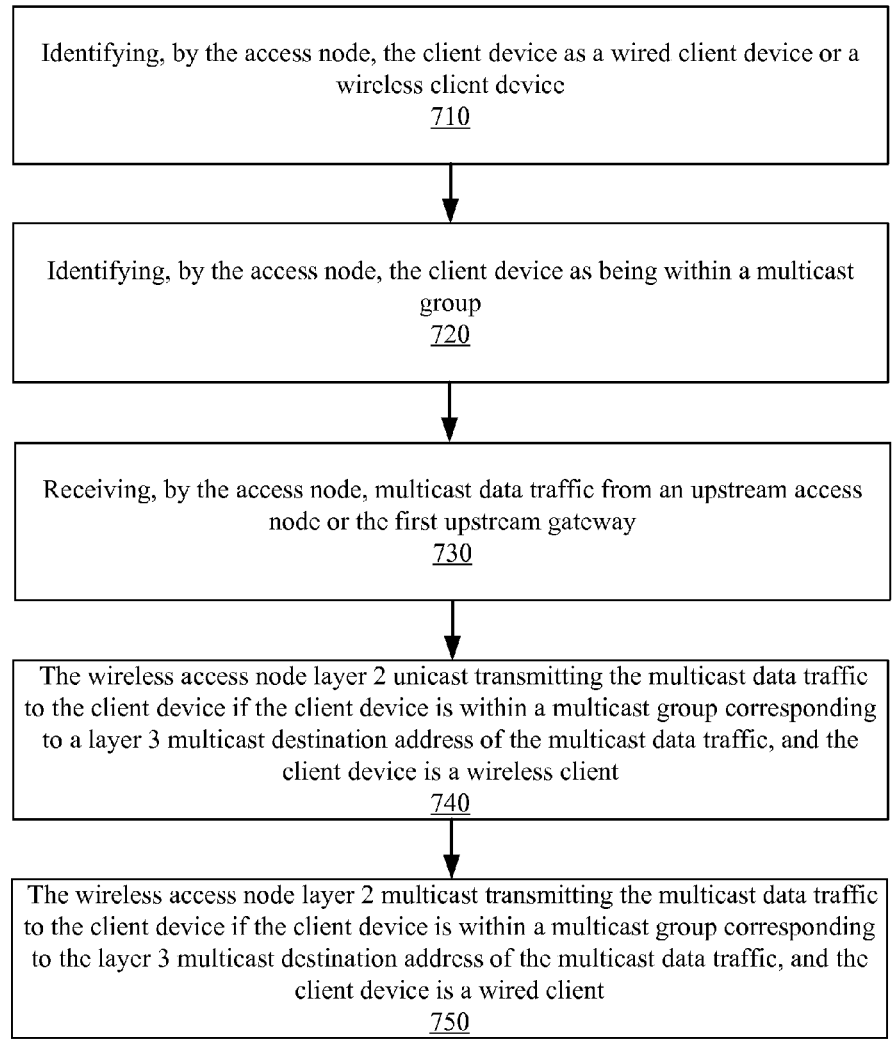
FIG. 7 shows a flow chart that includes steps of a method of an access node transmitting multicast data traffic to a wired or wireless client, according to an embodiment.

FIG. 7 shows a flow chart that includes steps of a method of an access node transmitting multicast data traffic to a wired or wireless client, according to an embodiment. A wired client is much more likely to have a high-quality reliable communication link with the access node than a wirelessly connected client device. Therefore, for an embodiment, the transmission of multicast data traffic from the access node to the client device can be selected to be a unicast transmission if the client is a wireless client due to the higher reliability of unicast transmission. If the client is a wired client, the transmission can be assumed to be more reliable.

According to the flow chart of FIG. 7, first step 710 includes identifying, by the access node, the client device as a wired client device or a wireless client device. A second step 720 includes identifying, by the access node, the client device as being within a multicast group. A third step 730 includes receiving, by the access node, multicast data traffic from an upstream access node or the first upstream gateway. A fourth step 740 includes the wireless access node layer 2 unicast transmitting the multicast data traffic to the client device if the client device is within a multicast group corresponding to a layer 3 multicast destination address of the multicast data traffic, and the client device is a wireless client. A fifth step 750 includes the wireless access node layer 2 multicast transmitting the multicast data traffic to the client device if the client device is within a multicast group corresponding to the layer 3 multicast destination address of the multicast data traffic, and the client device is a wired client.

An embodiment further includes the wireless access node determining if the client device is more than one wireless hop downstream from the wireless access node, and if the client device is more than one wireless hop downstream from the wireless access node, then the wireless access node layer 2 unicast transmitting the multicast data traffic to a downstream wireless access node.

Figure 8:
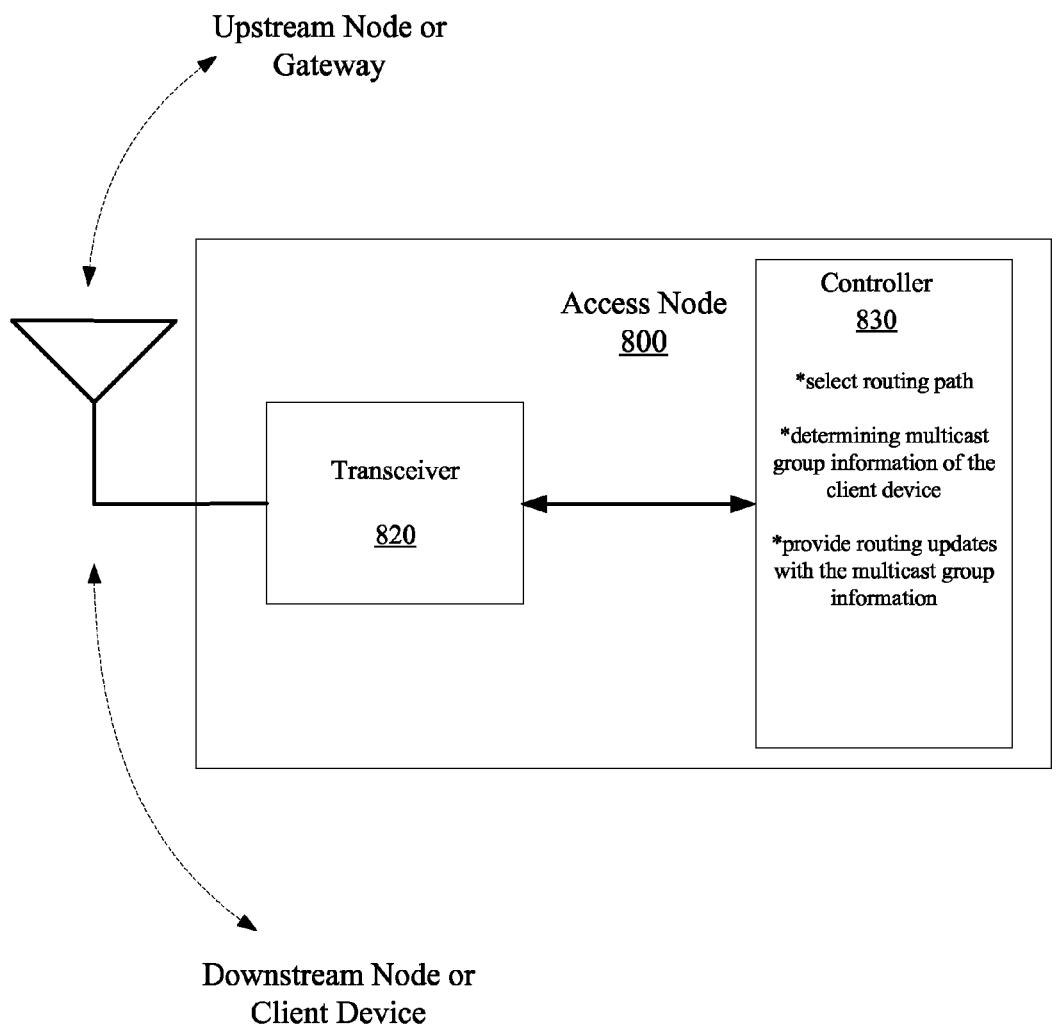
FIG. 8 show an access node, according to an embodiment.

FIG. 8 show an access node, according to an embodiment. As shown, the access node includes one or more transceivers (such as, transceiver 820) for communicating with an upstream access node or a first upstream gateway of a wireless mesh network, and a client device. The access node further includes a controller 830. For at least some embodiments, the controller 830 is operative to determine multicast group information of the client device, and provide routing updates to the upstream access node and the first upstream gateway, wherein the multicast group information of the client device is included within the routing updates of the client device.

For an embodiment, the controller 830 is further operative to identify the client device as a wired client device or a wireless client device, and identifying the client device as being within a multicast group. If the wireless access node receives multicast data traffic from an upstream access node or the first upstream gateway, and if the client device is within a multicast group corresponding to a layer 3 multicast destination address of the multicast data traffic, and the client device is a wireless client, then the wireless access node layer 2 unicast transmits the multicast data traffic to the client device, and if the client device is within a multicast group corresponding to the layer 3 multicast destination address of the multicast data traffic, and the client device is a wired client, then the wireless access node layer 2 multicast transmits the multicast data traffic to the client device.

An embodiment further includes the wireless access node determining if the client device is more than one wireless hop downstream from the wireless access node, and if the client device is more than one wireless hop downstream from the wireless access node, then the wireless access node layer 2 unicast transmitting the multicast data traffic to a downstream wireless access node.

Although specific embodiments have been described and illustrated, the embodiments are not to be limited to the specific forms or arrangements of parts so described and illustrated.

What is claimed:

1. A method of updating multicast group information of a client device of a wireless mesh network, comprising:
    an access node of the wireless mesh network determining multicast group information of the client device that is connected to the access node; and
    the access node providing routing updates to upstream access nodes and a first upstream gateway, wherein the multicast group information of the client device is included within the routing updates of the client device;
    the first upstream gateway sharing the multicast group information of the client device with neighboring gateways;
    the first upstream gateway deleting multicast and unicast information of the client device if the client device roams to a second gateway; and
    the second gateway accessing the multicast group information of the client device when the client device roams to the second gateway;
    wherein if the second gateway cannot obtain the multicast group information of the client device from the first upstream gateway or from one of neighboring gateways, the second gateway broadcasting over an upstream interface a request for the multicast group information of the client device.

2. The method of claim 1, wherein the first upstream gateway acts as a multicast proxy for client devices selecting to be associated with one or more multicast groups, wherein the gateway send IGMP packets to an upstream network for each group each of the client devices belongs to.

3. The method of claim 1, wherein once the second gateway obtains the multicast group information of the client device from the first upstream gateway or from one of neighboring gateways, the second gateway populating a multicast route of the client device.

4. A method of updating multicast group information of a client device of a wireless mesh network, comprising:
    an access node of the wireless mesh network determining multicast group information of the client device that is connected to the access node; and
    the access node providing routing updates to upstream access nodes and a first upstream gateway, wherein the multicast group information of the client device is included within the routing updates of the client device;
    identifying, by the access node, the client device as a wired client device or a wireless client device;
    identifying, by the access node, the client device as being within a multicast group;
    receiving, by the access node, multicast data traffic from an upstream access node or the first upstream gateway; and wherein
    if the client device is within a multicast group corresponding to a layer 3 multicast destination address of the multicast data traffic, and the client device is a wireless client, then the wireless access node layer 2 unicast transmitting the multicast data traffic to the client device; and wherein
    if the client device is within a multicast group corresponding to the layer 3 multicast destination address of the multicast data traffic, and the client device is a wired client, then the wireless access node layer 2 multicast transmitting the multicast data traffic to the client device.

5. The method of claim 4, further comprising the wireless access node determining if the client device is more than one wireless hop downstream from the wireless access node, and if the client device is more than one wireless hop downstream from the wireless access node, then the wireless access node layer 2 unicast transmitting the multicast data traffic to a downstream wireless access node.

6. A wireless access node, comprising:
    one or more transceivers for communicating with an upstream access node or a first upstream gateway of a wireless mesh network, and a client device;
    a controller, the controller operative to:
        determine multicast group information of the client device; and
        provide routing updates to the upstream access node and the first upstream gateway, wherein the multicast group information of the client device is included within the routing updates of the client device;
        identify the client device as a wired client device or a wireless client device;
        identify the client device as being within a multicast group;
    wherein
        if the client device is within a multicast group corresponding to a layer 3 multicast destination address of the multicast data traffic, and the client device is a wireless client, then the wireless access node layer 2 unicast transmits the multicast data traffic to the client device; and
    wherein
        if the client device is within a multicast group corresponding to the layer 3 multicast destination address of the multicast data traffic, and the client device is a wired client, then the wireless access node layer 2 multicast transmits the multicast data traffic to the client device.

7. The wireless access node of claim 6, wherein the first upstream gateway acts as a multicast proxy for all client devices selecting to be associated with one or more multicast groups.

8. The wireless access node of claim 6, wherein the first upstream gateway shares the multicast group information of the client device with neighboring gateways.

9. The access nod of claim 6, further comprising the wireless access node determining if the client device is more than one wireless hop downstream from the wireless access node, and if the client device is more than one wireless hop downstream from the wireless access node, then the wireless access node layer 2 unicast transmitting the multicast data traffic to a downstream wireless access node.

10. A wireless mesh network, comprising:
a first gateway;
an access node, wherein the access node is operative to:
 select a route through the wireless mesh network to the first gateway;
 determine multicast group information of a client device that is connected to the access node; and
 provide routing updates to upstream access nodes and the first gateway, wherein the multicast group information of the client device is included within the routing updates of the client device;
the first gateway operative to share the multicast group information of the client device with neighboring gateways;
the first gateway operative to delete multicast and unicast information of the client device if the client device roams to a second gateway; and
the second gateway operative to access the multicast group information of the client device when the client device roams to the second gateway;
wherein if the second gateway cannot obtain the multicast group information of the client device from the first upstream gateway or from one of neighboring gateways, the second gateway operative to broadcast a request for the multicast group information of the client device.

11. The network of claim 10, wherein the first gateway is connected to an upstream network, and is operative to act as a multicast proxy for client devices selecting to be associated with one or more multicast groups.

12. The network of claim 10, wherein once the second gateway obtains the multicast group information of the client device from the first upstream gateway or from one of neighboring gateways, the second gateway populates a multicast route of the client device.

13. A wireless mesh network, comprising:
a first gateway;
an access node, wherein the access node is operative to:
 select a route through the wireless mesh network to the first gateway;
 determine multicast group information of a client device that is connected to the access node; and
 provide routing updates to upstream access nodes and the first gateway, wherein the multicast group information of the client device is included within the routing updates of the client device;
 identify the client device as a wired client device or a wireless client device;
 identify the client device as being within a multicast group;
 receive multicast data traffic from an upstream access node or the first gateway; wherein
 if the client device is within a multicast group corresponding to a layer 3 multicast destination address of the multicast data traffic, and the client device is a wireless client, then the wireless access node layer 2 unicast transmits the multicast data traffic to the client device; and
wherein
 if the client device is within a multicast group corresponding to the layer 3 multicast destination address of the multicast data traffic, and the client device is a wired client, then the wireless access node layer 2 multicast transmits the multicast data traffic to the client device.

14. The network of claim 13, further comprising the wireless access node determining if the client device is more than one wireless hop downstream from the wireless access node, and if the client device is more than one wireless hop downstream from the wireless access node, then the wireless access node layer 2 unicast transmitting the multicast data traffic to a downstream wireless access node.

* * * * *